3,535,918
MICROADSORPTION DETECTOR FOR LIQUID CHROMATOGRAPHY

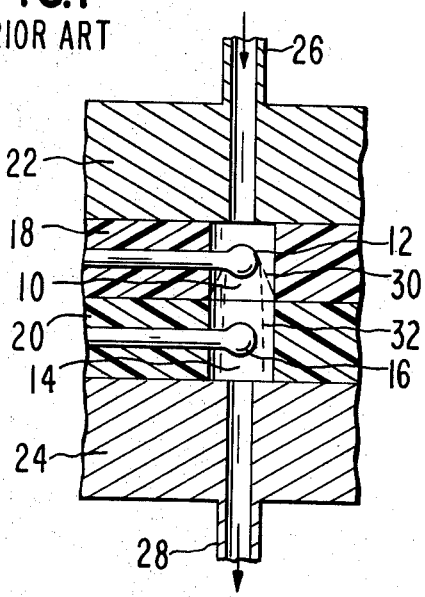
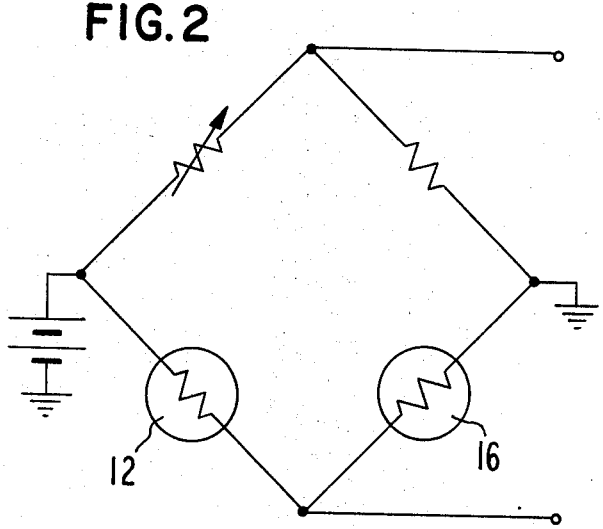
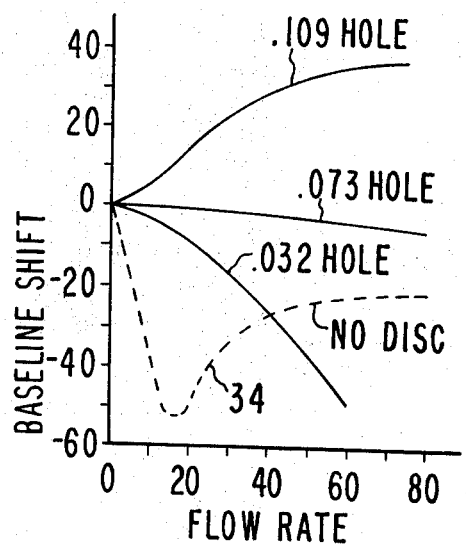
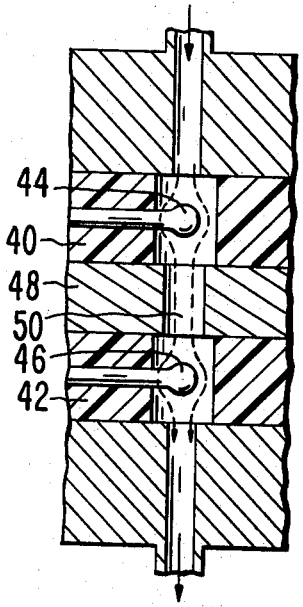
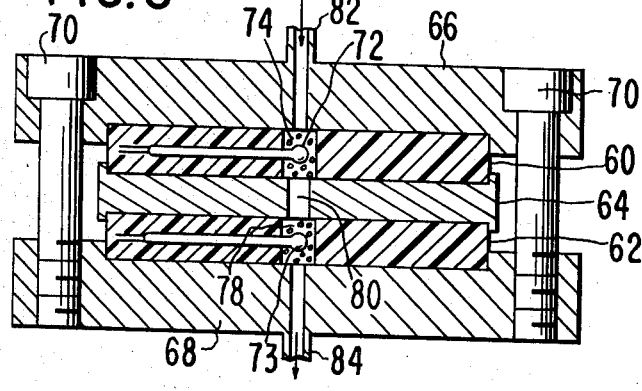
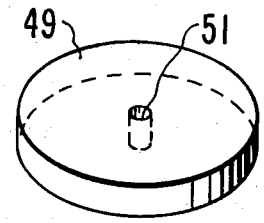

Miner Nelson Munk, Walnut Creek, Calif., assignor to Varian Associates, Palo Alto, Calif., a corporation of California
Filed Jan. 31, 1969, Ser. No. 795,492
Int. Cl. G01n *31/06, 31/20*
U.S. Cl. 73—61.1                           6 Claims

ABSTRACT OF THE DISCLOSURE

A novel microadsorption detector apparatus for use in liquid chromatography. A thermal conductor is provided in the flow stream separating a reference cell and a sensing cell. The thermal conductor provides a reduced cross sectional flow path between the two cells. Each cell is packed with a different particulate absorbent material.

BACKGROUND OF THE INVENTION

Whereas many different types of detectors have been found quite suitable for use in gas-liquid chromatography (GLC), there has until recently been no universal detector for use in liquid chromatography which in sensitivity and range of application is comparable to the thermal conductivity cell used in GLC. The microadsorption detector reported by Hupe-Bayer in the Journal of Gas Chromatography, page 197, April 1967 is regarded as a simple, sensitive and universal detector for liquid chromatography. It differs from earlier heat of adsorption detectors in that the reference and detection cells, which each use a thermistor as a sensing element, are located adjacent to one another in the liquid stream. Because of the close proximity of the reference cell to the adsorption cell in the solvent stream it is possible, using this device, to greatly reduce the influence of temperature fluctuations in the solvent stream and to consequently reduce the noise and drift of the detector. Unfortunately, however, this detector is very sensitive to changes in solvent flow rate. Its flow sensitivity therefore precludes the use of this detector with pulsating type pumps and translates a long term change in solvent flow rate into an annoying baseline drift.

Moreover, the presence of the reference cell upstream of the detection cell in this prior art detector results in undesirable band broadening of the detected signal. If, however, the cell positions are reversed, spurious peaks and loss of sensitivity are observed. Both are caused by the heat of adsorption released by the sample in the upstream detection cell. This heat travels downstream in the solvent and raises the temperature of the reference cell.

SUMMARY OF THE PRESENT INVENTION

The present invention relates generally to micro-adsorption detectors for use in liquid chromatography and more particularly to a novel improvement in the prior art detector which renders the detector insensitive to changes in flow rate of the flow stream therethrough.

With each step of adsorption and desorption in a chromatographic process, there is associated both an evolution and uptake of heat the values of which are approximately equal but of opposite sign. The total amount of heats due to adsorption and desorption depend on the concentration of substrate in the mobile phase. Therefore, a change in the concentration of the substance in the eluent will cause a change in temperature of the eluent plus adsorbent material which can be detected by very sensitive thermistors providing the substance in question and the carrier fluid have different affinities for the adsorbent.

As the liquid flowing in the system flows through the detector between the first thermistor and the second thermistor, a difference in heat content of the liquid can be measured which is a result of one or more of three possible phenomena which occur as the flow stream passes through the packing of the detector. The first of these phenomena relates to the heat of adsorption. As the liquid passes through the detector the adsorption of the liquid on the surfaces of the packing solids is accompanied by the evolution of heat due to a decrease in the enthalpy of the system. The evolution of heat that occurs in the detector is due to the replacement of one substance adsorbed on the solid by another.

The second source of heat is that which results from friction as the liquid flows through the packing and past the walls of the conduit as it passes through the detector.

The third source of heat is that which is introduced into the flow stream by the the heat dissipated by the thermistors themelves.

Ideally, one would like to design a detector in which only the heat or adsorption was detected. This is, however, difficult since the heat introduced by the upstream thermistors and the heat of friction of the flowing liquid cannot easily be avoided. And the amount of heat introduced by these two sources which reaches the downstream thermistor is dependent upon the flow rate of the liquid through the detector cell. Power dissipated in the upstream thermistor heats the carrier liquid which subsequently passes the downstream thermistor and the resulting temperature rise of the liquid is proportional thereto. The frictional heat increase in most cases is relatively small for increased flow rates within the usual ranges of operation.

The observed temperature difference between the upstream and downstream thermistors will depend on the flow rate for two reasons: First, the temperature rise of the liquid averaged over the flow channel will depend on the amount of liquid passing over the surface of the upstream thermistor per unit time. The faster the flow rate the smaller the temperature rise because the available power is dissipated into a larger volume of carrier liquid. Secondly, the temperature profile across the flow channel at the level of the downstream thermistor will also be a function of the flow rate since the heat from the top thermistor is transferred to the liquid near the center of the flow channel and as the flow rate increases the heat has less time to migrate outwardly toward the wall.

Thus, at sufficiently high flow rates, the heat is localized near the center of the channel and a large percentage thereof is transmited to the downstream thermistor. But since the heat disperses in the flow stream in what might be described as a conical path with the upstream thermistor at the apex and the base width being determined by the flow rate, one can easily see that the dispersion of heat in the stream cross section containing the downstream thermistor is dependent on the flow rate.

It is therefore a principal object of the present invention to design a microadsorption detector which either eliminates or compensates for the heat introduced into the flow stream by the thermistors while at the same time not causing a material increase in the heat of friction generated by the fluid flowing through the detector packing.

It is a further object of the present invention to design a microadsorption detector wherein the detection cell is located upstream of the reference cell without incurring spurious peaks in the detected signal and while minimizing loss of sensitivity.

IN THE DRAWINGS

FIG. 1 is a partial cross-section taken through a prior art microadsorption detector.

FIG. 2 illustrates the detection bridge arrangement used to compare the stream temperatures detected by the thermistors.

FIG. 3 is a baseline shift diagram which illustrates the advantages of the present invention over the prior art.

FIG. 4 is a partial cross-section taken through the detection chamber of the present invention.

FIG. 5 illustrates a preferred form of heat sink used in accordance with the present invention.

FIG. 6 is a cross-section of a completed microadsorption detector in accordance with the present invention.

DESCRIPTION OF THE PREFERRED EMBODIMENTS

Referring now to FIG. 1, a partial section of a microadsorption detector of the type used in the prior art for measuring the heat of adsorption in liquid chromatography is illustrated. This prior art detector consists of a reference cell 10 including a first thermistor 12, and a sensing cell 14 having a second thermistor 16. The cells 10 and 14 are formed by cylindrical apertures formed in a pair of discs 18 and 20 which are tightly held together by a pair of steel flanges 22 and 24. The flanges 22 and 24 are typically bolted together by means of bolts not shown. An entrance passage 26 is provided in the steel flange 22 and an exit passage 28 is provided in the steel flange 24 so as to complete a flow path through the detector structure. In one form of application the reference cell 10 is empty and the sensing cell 14 is filled with an adsorbent material which is held in place by filter papers placed at either end of the sensing cell.

As the liquid enters the inlet 26 and flows around the thermistor 12, heat given off by the thermistor 12 as a result of the power dissipated therein is transmitted to the liquid flowing around the thermistor. In the static or non-flowing instance the heat leaving this thermistor will attempt to spread radially outwardly toward the walls of the cell so as to be dissipated somewhat by conduction through the walls of the cells. But as the fluid is caused to flow through the cell at a relatively low flow rate the heat dispersion tends to follow a generally conical diverging path so that the heat from the thermistor 12 is more or less equally distributed across a flow stream cross-section well before it reaches the sensing thermistor 16. In this instance, although the discs 18 and 20 are typically poor heat conductors some of the heat will be lost thereto.

However, as the flow rate is increased the angle of conical divergence tends to flatten as indicated by the dashed lines 32 such that a considerably larger proportion of the heat introduced into the stream by thermistor 12 reaches the sensing thermistor 16. Thus, it will be seen that in the prior art apparatus the amount of heat being transferred from the thermistor 12 to the thermistor 16 is directly dependent upon the rate of flow of the liquid through the detector.

Referring now to FIG. 2 of the drawing, there is shown a resistance bridge, the thermistors 12 and 16 of which comprise two legs thereof. Since the output of the bridge is directly dependent upon the ratio of the differences of temperature sensed by the thermistors 12 and 16, it will be readily apparent that any increase or decrease in the percentage of heat transmitted from thermistor 12 to thermistor 16 will cause a shift in the baseline of the detector signal. This is illustrated in FIG. 3 wherein the dashed line 34 shows the baseline shift in the prior art device as the flow rate is increased. Clearly, such a shift precludes high sensitivity measurements where the flow rate changes with time.

Referring now to FIG. 4, there is shown an exploded section of a detector modified in accordance with the present invention. It will be noted that this detector likewise includes a pair of Teflon® discs 40 and 42 having apertures therein which provide both a reference chamber and a sensing chamber into which a reference thermistor 44 and a sensing thermistor 46 are projected. However, it will be noted that in this embodiment a metallic heat sink 48 is provided between the Teflon discs 40 and 42. The heat sink 48 includes an aperture 50 through which the flow stream passes. In a preferred embodiment, illustrated in FIG. 5, this heat sink 48 might comprise a flat disc of stainless steel or aluminum having a cylindrical aperture extending therethrough but may include one or more apertures of various other cross-sectional configurations.

As the liquid flows past the thermistor 44 and receives heat therefrom it then flows through the aperture 50 of the heat sink 48 and in so passing causes heat to be conducted away from the liquid in an amount substantially proportional to the amount of heat dissipated into the flow stream by the thermistor 44. The heat which is removed from the flow stream will, of course, be dependent upon the disc material, the thickness of the discs 48 and the diameter of the passage 50 therethrough. These characteristics are chosen in accordance with the particular application for which the detector is to be utilized.

In FIG. 3, three illustrative graphs are charted which show the effect on baseline shift readings taken for various flow rates produced by different size apertures and a ⅛ inch aluminum heat sink. It will be noted that with a very small hole, i.e., .032" in diameter there is slight improvement in the operation of the detector. However, as the hole size is increased to 0.73" it will be noted that for flow rates less than 80 cc./hr. there is relatively little baseline shift. And as the hole size is further increased to 0.109" in diameter, the baseline shift tends to shift in the other direction. This positive baseline excursion is apparently caused by the removal of thermistor heat by the heat sink 48 coupled with the decrease in frictional heat which results from the lessening of the restriction to flow due to the increase in aperture 50.

This graph indicates that for applications wherein the flow rate might be expected to vary within the 0–80 cc./hr. range, a ⅛ inch aluminum plate having an aperture of approximately 0.073 inch would substantially eliminate any baseline shift which might occur as a result of a change in flow rate of the fluid being passed through the detector. Of course it will be understood that the optimum diameter of aperture 50 will not be the same for all cases but may vary according to the thickness and material of the plate and other parameters of the system.

Referring now to FIG. 6, a completed micro-adsorption detector in accordance with the present invention is illustrated. In this embodiment a pair of circular Teflon discs 60 and 62 are separated by a stainless steel or aluminum disc 64 and are tightly clamped together by a pair of stainless steel flanges 66 and 68 having threaded securing means 70 spaced about the periphery thereof. Imbedded in the Teflon discs 60 and 62 are thermistors 72 and 73 which extend into the cylindrical openings 74 and 78 in each of the discs 60 and 62. These openings form part of the flow path through the detector structure and are communicated by an opening 80 in the metal disc 64.

In a preferred embodiment the reference cell 74 is packed with a relatively nonadsorbent particulate material such as glass beads while the sensing cell 78 is packed with an adsorbent material such as porous glass or the like. Although this embodiment includes a particulate packing in the reference cell, it is to be understood that for some applications, it will be found desirable to use no packing at all in the reference cell.

Tubular conduits 82 and 84 attached to the plates 66 and 68 provide means for passing a liquid through the detector. As the liquid passes around the thermistors the heat which is introduced into the flow stream by the upper thermistor 72 is dissipated as it passes through the aperture 80 in the metal disc 64. Thus, the baseline shift which is prevalent in the prior art structures is eliminated and because of this feature the detector is no longer critically sensitive to changes in flow rate of the fluid stream passing therethrough.

While the drawing illustrates embodiments wherein the reference cell is located upstream from the detection cell, the present invention also permits interchanging the positions of the detection and reference cells without resulting in spurious peaks and loss of sensitivity as with the prior art detectors. The metal disc removes the heat released by adsorption of the sample in the detection cell thus avoiding the above mentioned effects.

While the above disclosure represents a preferred embodiment of the invention, it is contemplated that many alterations and modifications may be made to the detector apparatus without departing from the merits of the invention. It is to be understood that this description is for purposes of illustration only and is in no manner intended to be limiting in any way.

I claim:

1. In a microadsorption detector means including a reference cell and a sensing cell serially disposed in close proximity to each other along the flow path of a fluid flow stream, said cells each including a thermally responsive sensing element, the improvement comprising:
    an apertured heat sink means disposed between said reference cell and said sensing cell such that the aperture thereof forms at least a portion of the flow path of a reduced cross sectional area between the sensing element of each cell and tends to remove from the flow stream as it passes therethrough an amount of heat approximately equal to that introduced into the stream by the first sensing element.

2. In a microadsorption detector means as recited in claim 1 wherein at least one of said cells is filled with a particulate adsorbent material.

3. A microadsorption detector for liquid chromatography comprising:
    means forming a reference chamber through which a fluid flow stream may be passed, having a thermally sensitive element disposed therein, and
    means forming a sensing chamber through which said fluid flow stream may be passed, also having a thermally sensitive element disposed therein, and
    said chambers being axially aligned and spaced from each other by an apertured spacer means having good heat conducting characteristics, the cross sectional area of the flow paths defined by the aperture in said spacer means being less than the cross sectional area of said reference and said sensing chambers and determined by the range of flow rates for which the detector is to be utilized so that said spacer means tends to remove from said flow stream an amount of heat approximately equal to that introduced into the stream by the thermally sensitive element upstream of said spacer means.

4. A microadsorption detector means for measuring the heat of adsorption of a moving fluid stream, said detector being substantially independent of the rate of flow of said fluid stream, said detector means comprising:
    means defining a reference chamber through which said stream may be passed,
    means defining a sensing chamber through which said stream may be passed,
    thermally responsive sensing means disposed in each of said chambers,
    said chambers being axially aligned and spaced from each other by an apertured heat conducting means the aperture of which forms a reduced cross section connecting flow path between said chambers.

5. A microadsorption detector means as recited in claim 4 wherein at least one of said chambers is filled with a particulate adsorbent material.

6. In a microadsorption detector means including a reference cell and a sensing cell serial disposed in close proximity to each other along the flow path of a fluid flow stream, said cells each including a thermally responsive sensing element, the improvement comprising:
    an apertured heat sink means disposed between said reference cell and said sensing cell such that the aperture thereof forms at least a portion of the flow path between the sensing element of each cell and tends to remove from the flow stream as it passes therethrough an amount of heat approximately equal to that introduced into the stream by the first sensing element, and each of said cells is filled with a different type of particulate material.

References Cited

Hamilton, L. H. Application of the Fisher Model 25 Gas Partitioner to Respiratory and Blood Gas Determinations, August 1961.

Huper-Bayer: A Micro Adsorption Detector for General Use in Liquid Chromatography In. Journ. of Gas Chrom., vol. 5, pp. 197–201, April 1967.

LOUIS R. PRINCE, Primary Examiner

JOSEPH W. ROSKOS, Assistant Examiner

U.S. Cl. X.R.

23—253; 210—31, 198